(12) United States Patent
Hatta et al.

(10) Patent No.: US 12,407,589 B2
(45) Date of Patent: Sep. 2, 2025

(54) PACKET CAPTURE DEVICE AND PACKET CAPTURE METHOD

(71) Applicant: Nippon Telegraph and Telephone Corporation, Tokyo (JP)

(72) Inventors: Saki Hatta, Tokyo (JP); Hiroyuki Uzawa, Tokyo (JP); Shuhei Yoshida, Tokyo (JP); Koyo Nitta, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/568,470

(22) PCT Filed: Jun. 11, 2021

(86) PCT No.: PCT/JP2021/022234
§ 371 (c)(1),
(2) Date: Dec. 8, 2023

(87) PCT Pub. No.: WO2022/259502
PCT Pub. Date: Dec. 15, 2022

(65) Prior Publication Data
US 2024/0275700 A1    Aug. 15, 2024

(51) Int. Cl.
*H04L 43/062* (2022.01)
*H04L 43/026* (2022.01)
(Continued)

(52) U.S. Cl.
CPC ......... *H04L 43/062* (2013.01); *H04L 43/067* (2013.01); *H04L 43/16* (2013.01)

(58) Field of Classification Search
CPC ..... H04L 43/062; H04L 43/067; H04L 43/16; H04L 43/026; H04L 43/12
See application file for complete search history.

(56) References Cited

U.S. PATENT DOCUMENTS 8,937,962 B2 * 1/2015 Tomonaga ............... H04L 65/80
370/428
2005/0213504 A1 * 9/2005 Enomoto ................ H04L 47/32
370/235
(Continued)

FOREIGN PATENT DOCUMENTS

JP    4955722 B2    3/2012

OTHER PUBLICATIONS

R. Takao, "IOS-XE: How to capture packets using EPC (Embedded Packet Capture)," Cisco Community, Jul. 22, 2020, 39 pages total with English Translation.

*Primary Examiner* — Kamal M Hossain
(74) *Attorney, Agent, or Firm* — Slater Matsil, LLP

(57) ABSTRACT

A packet capture device a packet analysis unit that analyzes an input packet; a flow identification unit that identifies a flow as a capture target; an output adjustment unit that adjusts a packet amount of the flow as the capture target to be output to a storage unit; a buffer unit that temporarily accumulates a packet of the flow as the capture target; and the storage unit that stores the packet of the flow as the capture target, in which the output adjustment unit is configured to decide whether to output the packet of the flow as the capture target to the storage unit for each predetermined measurement interval on the basis of a measurement result of the packet amount of the capture target in a predetermined measurement interval, and discard the packet not to be output to the storage unit.

14 Claims, 11 Drawing Sheets

(51) Int. Cl.
*H04L 43/067* (2022.01)
*H04L 43/16* (2022.01)
*H04L 43/12* (2022.01)

(56) References Cited

U.S. PATENT DOCUMENTS

| | | | |
|---|---|---|---|
| 2013/0254324 A1* | 9/2013 | Kramnik | H04L 43/04 709/213 |
| 2013/0258858 A1 | 10/2013 | Cherian et al. | |
| 2014/0355613 A1 | 12/2014 | Pope et al. | |
| 2017/0339062 A1* | 11/2017 | Mayer-Wolf | H04L 49/9005 |
| 2022/0045918 A1* | 2/2022 | Ogita | H04L 43/022 |

\* cited by examiner

PACKET CAPTURE DEVICE AND PACKET CAPTURE METHOD

CROSS-REFERENCE TO RELATED APPLICATIONS

This application is a national phase entry of PCT Application No. PCT/JP2021/022234, filed on Jun. 11, 2021, which application is hereby incorporated herein by reference.

TECHNICAL FIELD

The present invention relates to a packet capture technology of capturing a packet in a network.

BACKGROUND

With the progress of virtualization technology in network functions virtualization (NFV)/software defined networking (SDN), various services using virtual machines (VMs) and the like are provided, and the network becomes large and complicated. A packet capture device capable of selectively capturing a packet of a specific flow (aggregate of packets in which a rule obtained by combining transmission source/ destination MAC addresses, IP addresses, and the like is the same) is one of devices essential for failure analysis of the network described above.

FIG. 11 illustrates a configuration diagram of a conventional packet capture device (Patent Literature 1). The conventional packet capture device includes a packet analysis unit 11 that analyzes a header of an input packet, and a flow identification unit 12 that specifies a flow registered in a rule table. A filtering unit 13 discards a flow packet that does not correspond in the flow identification unit 12, outputs the corresponding flow to a capture file generation unit, buffers a plurality of packets to be collected, then converts the packet into a capture file, and stores the capture file in a storage unit 16.

CITATION LIST

Patent Literature

Patent Literature 1: JP 4955722 B2

SUMMARY

Technical Problem

In the configuration of the conventional device, when a packet input rate exceeds a capture rate (processing speed of conversion into a capture file and writing to a storage medium), the process of writing the capture file into the storage unit 16 cannot be performed in time, and the buffer overflows. There is a problem that continuous discarding of input packets occurs for a long time due to buffer overflow, and there is a possibility that all capture data in a time zone required for analysis is lost.

As a method for avoiding continuous discarding, it is conceivable to prepare a sufficient amount of buffers, but the amount of buffers capable of filling the difference between the input rate and the internal processing speed at the high speed NW becomes enormous, and there is a problem that the circuit scale becomes large.

Embodiments of the present invention have been made to solve the above problems, and an object of embodiments of the present invention is to provide a packet capture device capable of preventing loss of capture data due to continuous discarding of input packets while avoiding an increase in circuit scale.

Solution to Problem

In order to solve the above problem, provided is a packet capture device that captures a packet flowing through a capture target network, the packet capture device including: a packet analysis unit that analyzes an input packet; a flow identification unit that identifies a flow as a capture target; an output adjustment unit that adjusts a packet amount of the flow as the capture target to be output to a storage unit; a buffer unit that temporarily accumulates a packet of the flow as the capture target; and the storage unit that stores the packet of the flow as the capture target, in which the output adjustment unit is configured to decide whether to output the packet of the flow as the capture target to the storage unit for each predetermined measurement interval on the basis of a measurement result of the packet amount of the capture target in a predetermined measurement interval, and discard the packet not to be output to the storage unit.

In order to solve the above problem, a packet capture method of embodiments of the present invention is a packet capture method in a packet capture device that captures a packet flowing through a capture target network, the packet capture method including steps of: analyzing an input packet; identifying a flow as a capture target; adjusting a packet amount of the flow as the capture target to be stored; temporarily accumulating a packet of the flow as the capture target; and storing the packet of the flow as the capture target, in which, in the adjusting the packet amount, whether to store the packet of the flow as the capture target for each predetermined measurement interval is decided on the basis of a measurement result of the packet amount of the capture target in a predetermined measurement interval, and the packet not to be stored is discarded.

Advantageous Effects of Embodiments of Invention

According to embodiments of the present invention, it is possible to provide a packet capture device capable of preventing loss of capture data due to continuous discarding of input packets while avoiding an increase in circuit scale.

DETAILED DESCRIPTION OF ILLUSTRATIVE EMBODIMENTS

Hereinafter, embodiments of the present invention will be described in detail with reference to the drawings. The present invention is not limited to the following embodiments.

First Embodiment

Figure 1:
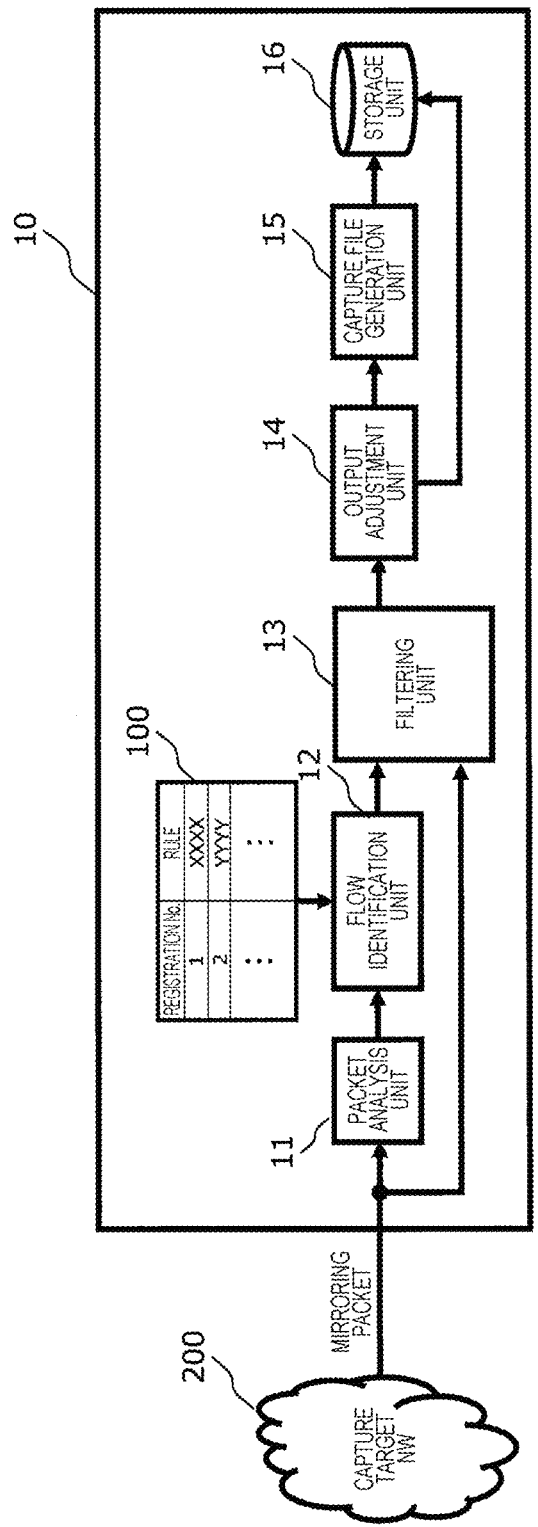
FIG. 1 is a diagram illustrating a configuration example of a packet capture device according to a first embodiment of the present invention.
Figure 2:
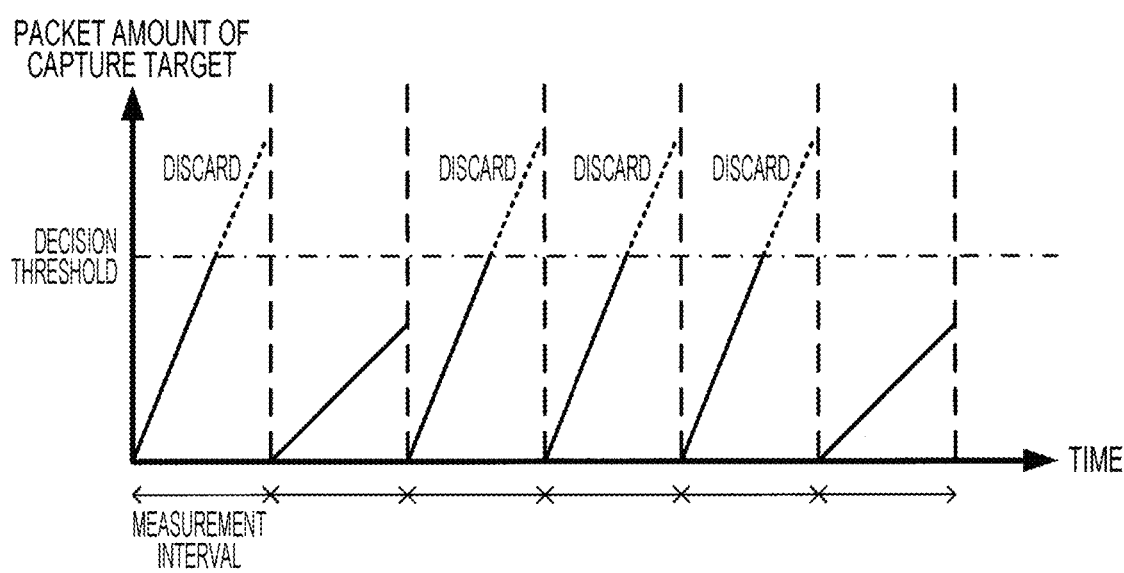
FIG. 2 is a diagram for explaining an operation of an output adjustment unit according to the first embodiment of the present invention.

A first embodiment of the present invention will be described. FIG. 1 is a diagram illustrating a configuration example of a packet capture device according to the first embodiment of the present invention. FIG. 2 is a diagram for explaining an operation of an output adjustment unit according to the first embodiment of the present invention.

Configuration of Packet Capture Device

A packet capture device 10 is a device that captures a packet flowing through a capture target network 200. The packet capture device 10 includes: a packet analysis unit 11 that analyzes an input packet; a flow identification unit 12 that identifies a flow as a capture target; a filtering unit 13 that filters the packet of the flow as the capture target on the basis of an identification result of the flow identification unit 12; an output adjustment unit 14 that adjusts a packet amount of the flow as the capture target to be output to a storage unit 16; a capture file generation unit 15 that has a buffer for temporarily accumulating a packet in order to generate a capture file of the flow as the capture target and generates the file; and the storage unit 16 that stores the packet of the flow as the capture target. The output adjustment unit 14 is arranged in a preceding stage of the capture file generation unit 15, and is configured to decide whether to output the packet of the flow as the capture target to the storage unit 16 and discard the packet not to be output to the storage unit 16. The output adjustment unit 14 can prevent the occurrence of the long-time continuous discarding of the input packet by discarding the packets thinned out for each measurement interval.

Operation of Output Adjustment Unit

FIG. 2 is a diagram for explaining an operation of an output adjustment unit according to the first embodiment of the present invention. The output adjustment unit is configured to decide whether to output the packet of the flow as the capture target to the storage unit 16 every predetermined measurement interval on the basis of the measurement result of the packet amount of the capture target in the predetermined measurement interval, and discard the packet not to be output to the storage unit 16.

In FIG. 2, the packet amount of the packet to be captured is measured at predetermined measurement intervals, and when the measured packet amount is equal to or larger than a predetermined decision threshold, the packet as the capture target input thereafter is discarded. When the measurement interval ends, the measured packet amount is reset, and the measurement of the packet amount is resumed. Thereafter, by repeating this operation, packet discard processing is performed at predetermined measurement intervals.

By such an operation, input packet discarding can be performed by thinning out at regular measurement intervals. Therefore, it is possible to avoid packet discarding that continues for a long time while avoiding an increase in the circuit scale without preparing an enormous buffer amount. In FIG. 2, as the measurement interval is made smaller, the discard frequency becomes higher, and the amount of packets discarded in one measurement interval becomes smaller. The measurement interval can be appropriately determined by the user according to system requirements such as the amount of packets to be captured and the buffer amount.

Configuration of Output Adjustment Unit

Figure 3:
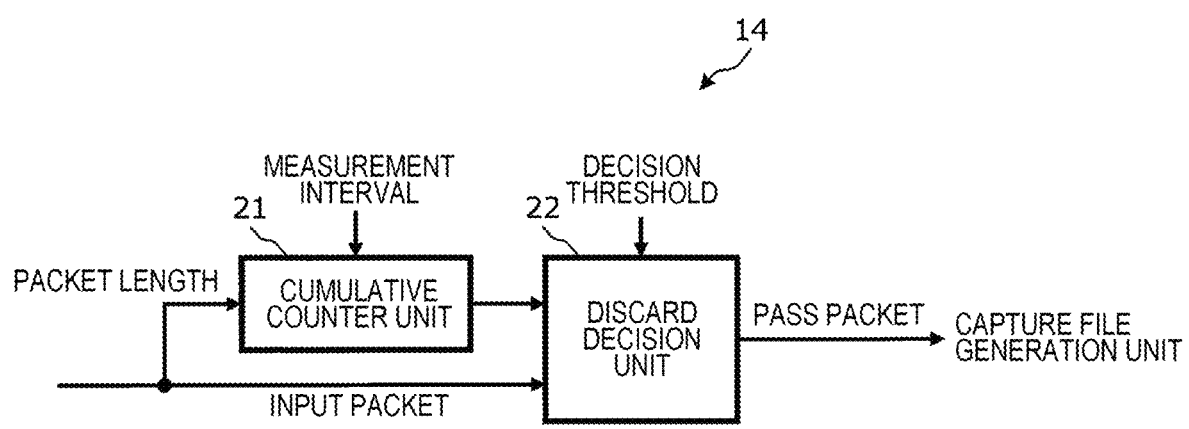
FIG. 3 is a diagram illustrating a configuration example of the output adjustment unit according to the first embodiment of the present invention.

FIG. 3 is a diagram illustrating a configuration example of the output adjustment unit according to the first embodiment of the present invention. In the configuration example of FIG. 3, the output adjustment unit 14 includes a cumulative counter unit 21 that accumulates and adds the byte (bit) length of the input packet by the measurement interval, and a discard decision unit 22 that compares the cumulative addition value in the cumulative counter unit 21 with a decision threshold and determines whether to discard the input packet. The discard decision unit 22 allows a packet output to the storage unit 16 to pass as a pass packet at each measurement interval, and discards a packet not output to the storage unit 16.

The counter of the cumulative counter unit 21 starts cumulative addition after the start of the measurement interval, is reset after the measurement interval elapses, and this is repeated. As a result, a packet output to the storage unit 16 is determined for each measurement interval and a packet not output to the storage unit 16 can be discarded. The measurement interval can be changed by user setting, and the measurement interval can be appropriately set according to system requirements.

When the capture rate as the bottleneck is known in advance, the maximum count value according to the capture rate as the bottleneck can be set as the decision threshold in the discard decision unit 22 by setting the value of capture rate x measurement interval. The discard decision unit 22 is configured to compare the calculated rate of the input packet with the decision threshold and discard the input packet when the cumulative counter value>the decision threshold is satisfied.

When the cumulative counter value>the decision threshold is not satisfied, the input packet is output to the capture file generation unit 15 as a pass packet. The capture file generation unit 15 includes a two-sided buffer of a passage packet writing surface and a writing surface to the storage unit 16, and can simultaneously write the passage packet into the buffer and output the passage packet from the buffer to the storage unit 16 by the two-sided buffer.

Operation of Packet Capture Method

A packet capture method of embodiments of the present invention includes steps of: analyzing an input packet; identifying a flow as a capture target; temporarily accumulating a packet of the flow as the capture target; storing the packet of the flow as the capture target in a storage unit 16; and determining the packet to be output to the storage unit 16 at predetermined measurement intervals on the basis of a measurement result of a packet amount of the capture target at a predetermined measurement interval and discarding the packet not to be output to the storage unit 16.

Figure 4:
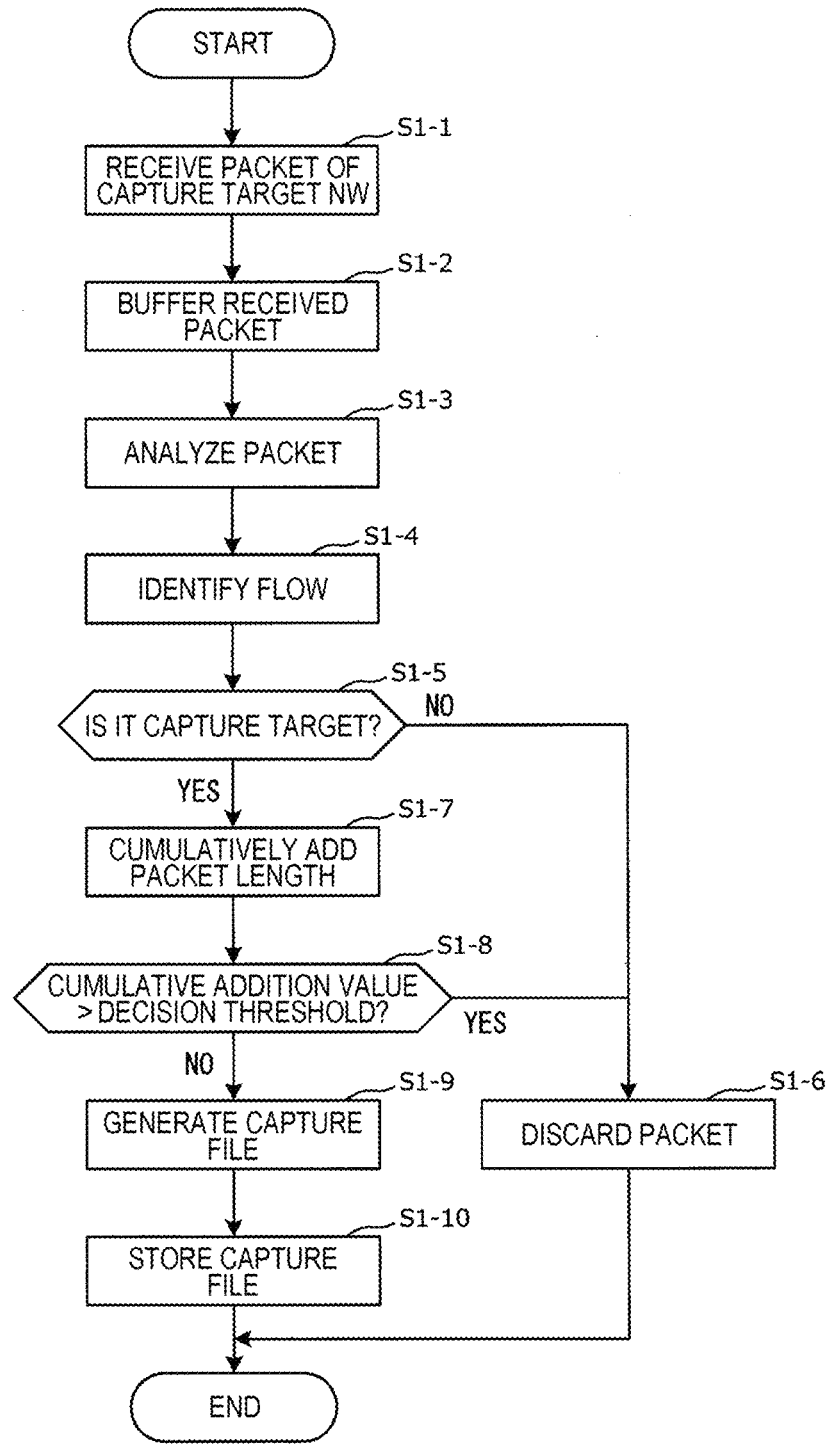
FIG. 4 is a flowchart illustrating an operation procedure of a packet capture method according to the first embodiment of the present invention.

FIG. 4 is a flowchart illustrating an operation procedure of a packet capture method according to the first embodiment of the present invention. In the packet capture device 10, when a packet is received from the capture target network 200 (step S1-1), the received packet is buffered (step S1-2), and header information is extracted by performing header analysis of the packet (step S1-3).

Next, the header extracted by the header analysis is compared with a rule in a rule table 100 to identify whether the flow is a flow as a capture target (step S1-4). When the flow does not match the rule (step S1-5: NO), the buffered packet is discarded (step S1-6).

When the flow matches the rule (step S1-5: YES), the packet length in the measurement interval is cumulatively added (step S1-7), and the cumulative addition value of the packet length is compared with the decision threshold (step S1-8). When the cumulative addition value is larger than the decision threshold (step S1-8: YES), the packet is discarded (step S1-6).

When the cumulative addition value is equal to or smaller than the decision threshold (step S1-8: NO), a capture file is generated (step S1-9), and the generated capture file is stored in the storage unit (step S1-10).

As described above, in the first embodiment, the output adjustment unit 14 that determines whether to output the packet of the flow as the capture target to the storage unit 16 for each predetermined measurement interval on the basis of the measurement result of the packet amount of the capture target in the predetermined measurement interval and discards the packet not to be output to the storage unit 16 is provided. Therefore, it is possible to finely discard the input packet in units of measurement intervals, and it is possible to avoid the continuously discarding of the input packet for a long time due to buffer overflow.

In the present embodiment, the case where it is determined whether to output the packet of the flow as the capture target to the storage unit 16 by comparing the cumulative addition value of the packet length with the decision threshold has been described. However, the amount of the packet of the capture target as a reference for determination can be acquired by another method. For example, the output adjustment unit 14 may acquire the accumulation amount of packets accumulated in the buffer of the capture file generation unit 15 at a predetermined measurement interval, and determine whether to output the packet to the storage unit 16 on the basis of the accumulation amount.

In this case, the discard decision unit 22 is configured to output the input packet of the capture target to the buffer unit when the accumulation amount in the buffer of the capture file generation unit 15 is equal to or smaller than a predetermined decision threshold, and discard the input packet of the capture target when the accumulation amount in the buffer unit is larger than the predetermined decision threshold.

The rate of the packet of the capture target is calculated using the cumulative addition value of the packet length which is the amount of the packet of the capture target, and the calculated rate and the capture rate of the capture file conversion are compared to determine whether to discard the packet. In this case, a writing rate of a packet from the buffer unit to the storage unit 16 can be used as the decision threshold in the discard decision unit 22.

As described above, by determining whether to discard the packet by using the information on the accumulation amount in the buffer and the packet writing rate from the buffer to the storage unit 16, it is possible to avoid continuous discarding of the input packet for a long time due to buffer overflow.

Second Embodiment

In the first embodiment, a configuration has been described in which the output adjustment unit 14 cumulatively adds the byte (bit) length of the input packet at the measurement interval and discards the input packet until the start of the next measurement interval after the cumulative addition value exceeds the decision threshold, so that the discard amount of the discard packet can be thinned out. In the second embodiment, a configuration example in which discarded packet information is clarified by counting discarded packet types will be described.

Figure 5:
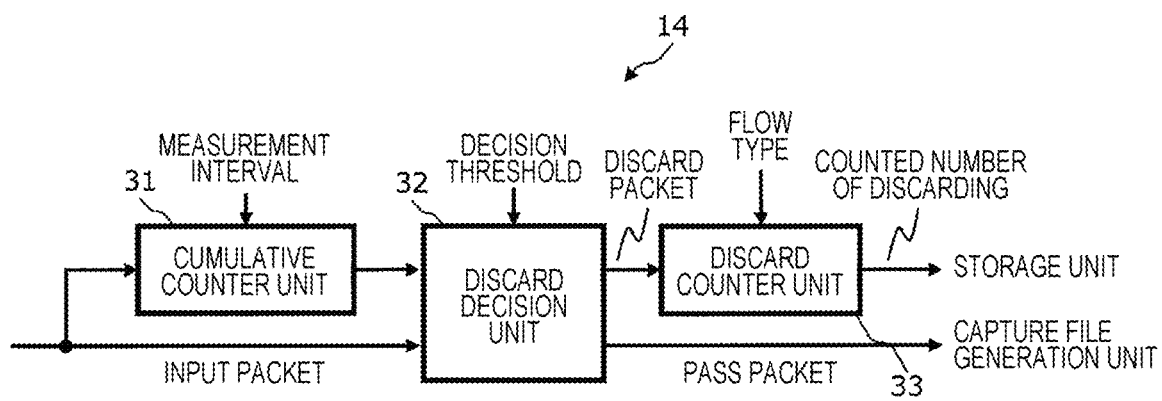
FIG. 5 is a diagram illustrating a configuration example of the output adjustment unit according to a second embodiment of the present invention.

FIG. 5 is a diagram illustrating a configuration example of the output adjustment unit according to a second embodiment of the present invention. The difference from the output adjustment unit 14 of the first embodiment is that a discard counter unit 33 that counts the number of discarded packets of the discarded packet for each type is provided. The discard counter unit 33 identifies the packet discarded by the discard decision unit 22 for each flow and counts the number of packets discarded for each flow of the packet. The flow is identified using a result of type determination by the flow identification unit 12. A counter for counting the number of discarded packets may be prepared for each flow type, or when a counter scale for each flow is increased, a counter for collectively counting a plurality of flows may be prepared.

Figure 6:
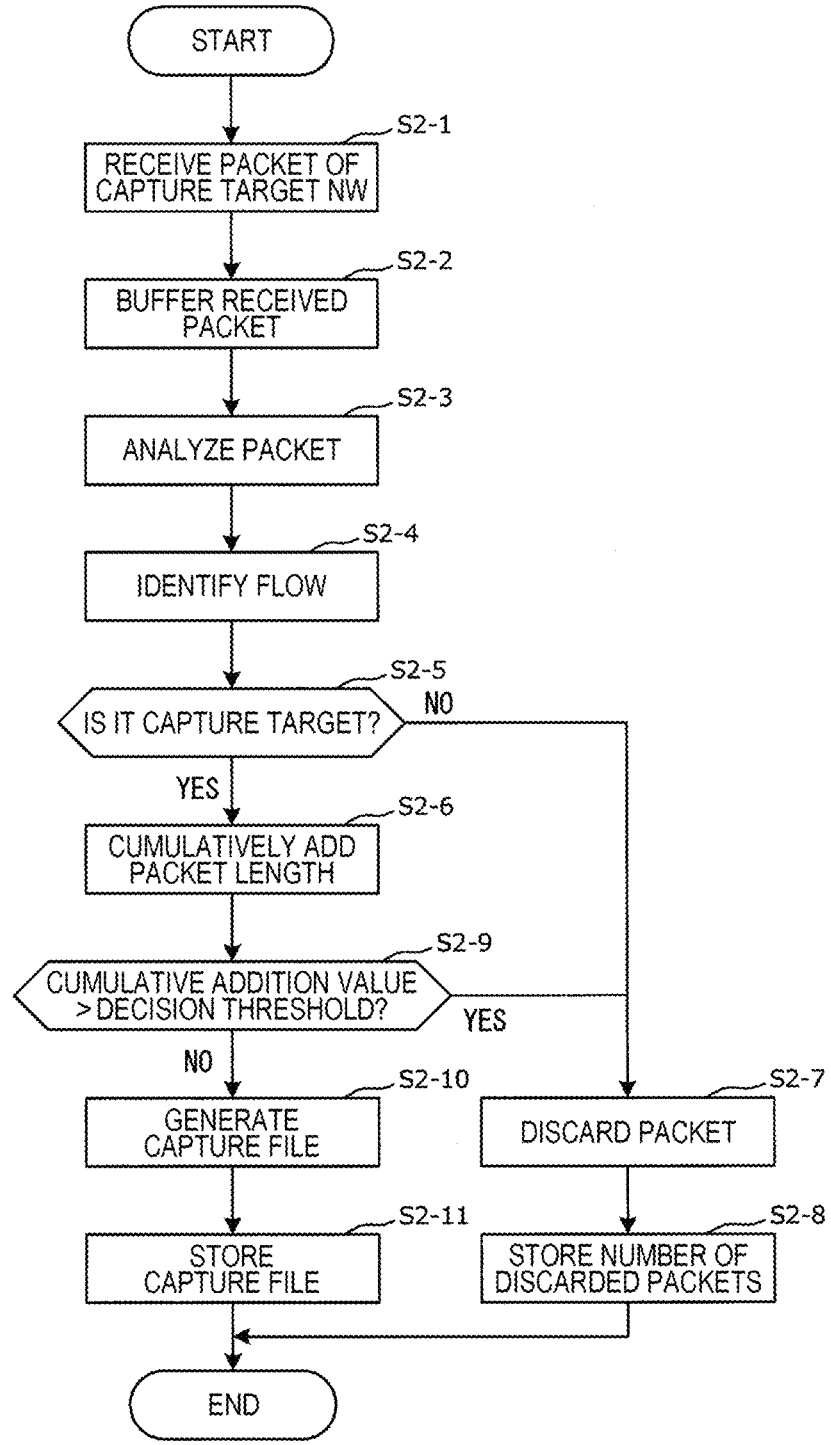
FIG. 6 is a flowchart illustrating an operation procedure in a packet capture device according to the second embodiment of the present invention.

FIG. 6 is a flowchart illustrating an operation procedure in a packet capture device according to the second embodiment of the present invention. Processing similar to the flowchart of FIG. 4 is performed except that processing of storing the number of discarded packets for each flow (step S2-8) is added.

As described above, according to the second embodiment, by outputting the number of discarded packets for each flow of packets to the storage unit 16, it is possible to grasp the type of the discarded flow and the number of discarded packets through the storage unit 16. With such a configuration, even if the content of the packet cannot be grasped as the capture file, the type and number of flows of the discarded packet can be grasped, so that it is possible to provide data useful for analysis after packet capture.

Third Embodiment

In the first and second embodiments, a configuration has been described in which the output adjustment unit 14 cumulatively adds the byte (bit) length of the input packet at the measurement interval and discards the input packet until the start of the next measurement interval after the cumulative addition value exceeds the decision threshold, so that the discard amount of the discard packet can be thinned out. In the case of the first and second embodiments, since it is not determined whether to discard on the basis of the buffer accumulation amount of the capture file generation unit 15, when the capture rate decreases due to processing other than the capture rate as a bottleneck, and when the decision threshold for determining whether to discard is constant, buffer overflow may occur. In the third embodiment, a configuration example in which the decision threshold is dynamically changed on the basis of the buffer accumulation amount of the capture file generation unit 15 will be described.

Figure 7:
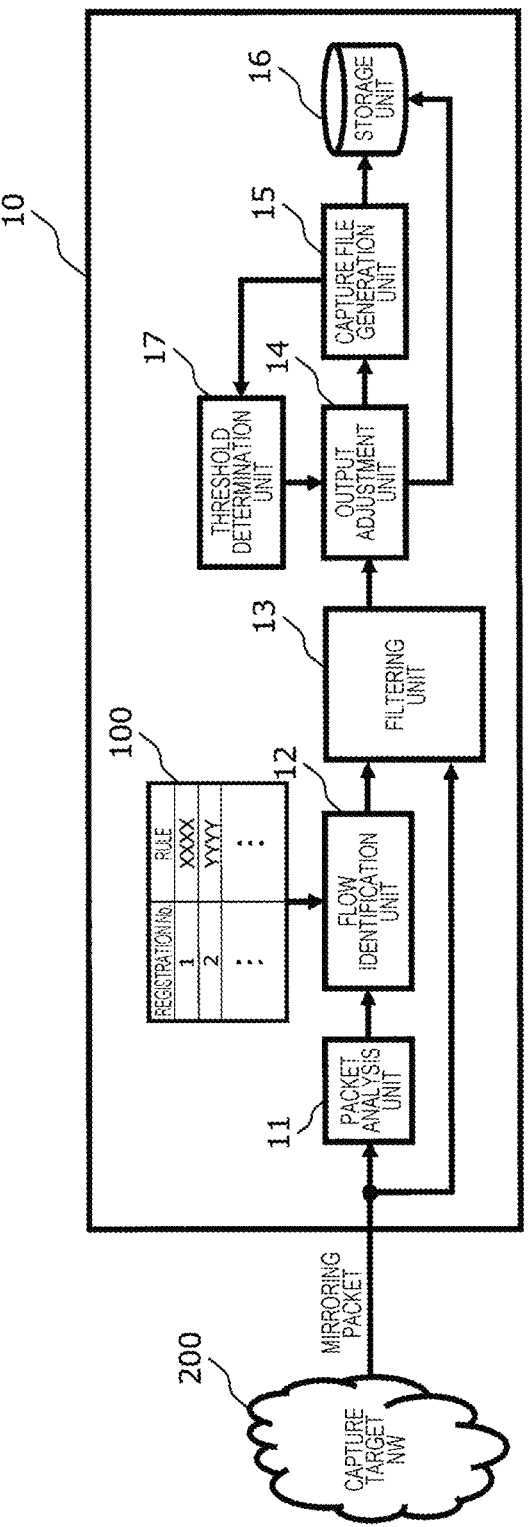
FIG. 7 is a diagram illustrating a configuration example of a packet capture device according to a third embodiment of the present invention.

FIG. 7 is a diagram illustrating a configuration example of a packet capture device according to a third embodiment of the present invention. The present embodiment is different from the first and second embodiments in that a threshold determination unit 17 that dynamically determines a threshold on the basis of the buffer accumulation amount of the capture file generation unit 15 is added.

In the threshold determination unit 17, since the number of packet processing that can be processed without causing buffer overflow can be grasped from the buffer accumulation amount, for example, when the buffer accumulation amount is large, it is an imminent situation immediately before the buffer overflow. Therefore, by setting a decision threshold of a small value, packets are promptly discarded and thinned out. On the other hand, when the buffer accumulation amount is relatively small, since there is a margin in the buffer amount, control is performed such that the decision threshold is determined to be a relatively large value according to the buffer accumulation amount.

Control of Decision Threshold According to Buffer Accumulation Amount

The threshold determination unit 17 dynamically determines a threshold on the basis of the buffer accumulation amount of the capture file generation unit 15. In the present embodiment, a plurality of accumulation amount thresholds for determining the magnitude of the accumulation amount of the packet and a plurality of predetermined decision thresholds are provided, and the decision threshold is determined on the basis of a comparison result between the accumulation amount of the packet and the plurality of accumulation amount thresholds. The decision threshold is changed for each measurement interval.

For example, the accumulation amount of the packet in the buffer is divided into four stages, the accumulation amount threshold (AC_high, AC_mid, AC_low, AC_high>AC_mid>AC_low) is determined as the accumulation amount threshold of three buffers serving as the divisions of the respective stages, and the decision threshold (TH_low, TH_mid, TH_high 1, TH_high 2, TH_low<TH_mid<TH_high 1<TH_high 2) corresponding to these accumulation amount thresholds is determined. In the following description, a case where the accumulation amount of packets in the buffer is divided into four stages will be described, but the number of the accumulation amount threshold and the number of the decision threshold are not limited thereto, and the number of the accumulation amount threshold and the number of the decision threshold can be appropriately determined by the user according to system requirements such as the amount of packets to be captured and the buffer amount.

Assuming that the accumulation amount threshold indicating a state in which the buffer accumulation amount is large is AC_high (first accumulation amount threshold), the accumulation amount threshold indicating a state in which the buffer accumulation amount is medium is AC_mid (second accumulation amount threshold), and the accumulation amount threshold indicating a state in which the buffer accumulation amount is small is AC_low (third accumulation amount threshold), when the buffer accumulation amount>AC_high, the decision threshold is set to TH_low (first decision threshold) that is the lowest since the state is immediately before the buffer overflow, and the packet is quickly discarded.

As similar to this, when AC_high>buffer accumulation amount>AC_mid, the decision threshold is determined as TH_mid (second decision threshold), when AC_mid>buffer accumulation amount>AC_low, the decision threshold is determined as TH_high (third decision threshold), and when AC_low>buffer accumulation amount>0, the decision threshold is determined as TH_high2 (fourth decision threshold).

Figure 8:
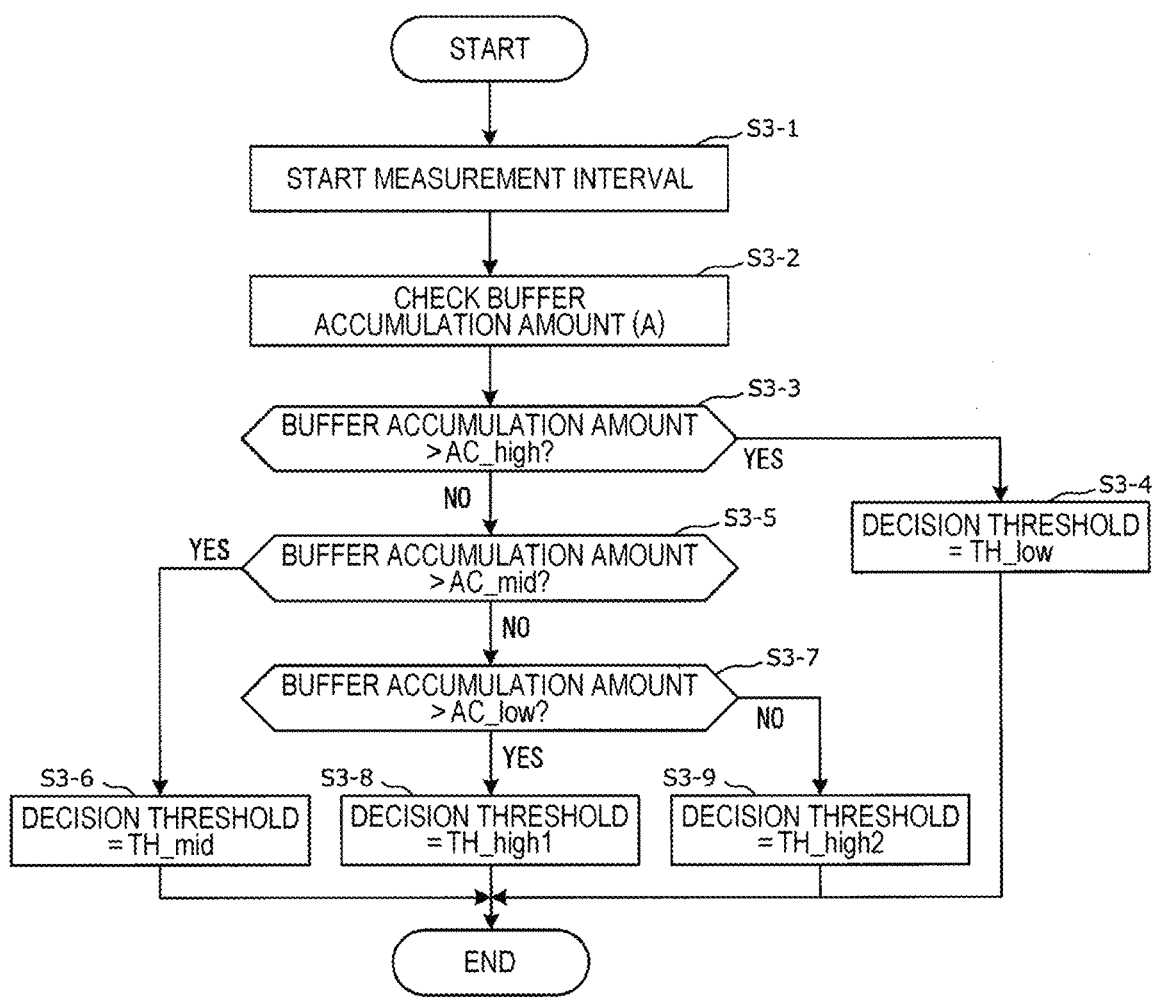
FIG. 8 is a flowchart illustrating an example of an operation procedure in a threshold determination unit according to the third embodiment of the present invention.

FIG. 8 is a flowchart illustrating an example of an operation procedure in a threshold determination unit according to the third embodiment of the present invention. FIG. 8 is an operation procedure when the threshold is changed in accordance with the measurement interval. When the measurement interval starts (step S3-1), the accumulation amount of the buffer is checked (step S3-2). When the accumulation amount of the buffer is larger than AC_high (step S3-3: YES), the decision threshold is determined to be TH_low (step S3-4).

When the accumulation amount of the buffer is equal to or smaller than AC_high (step S3-3: NO), the accumulation amount of the buffer is compared with AC_mid (step S3-5), and when the accumulation amount of the buffer is larger than AC_mid (step S3-5: YES), the decision threshold is determined to TH_mid larger than TH_low (step S3-6).

When the accumulation amount of the buffer is equal to or smaller than AC_mid (step S3-5: NO), the accumulation amount of the buffer is compared with AC_low (step S3-7), and when the accumulation amount of the buffer is larger than AC_low (step S3-7: YES), the decision threshold is determined to TH_high1 larger than TH_mid (step S3-8).

When the accumulation amount of the buffer is equal to or smaller than AC_low (step S3-7: NO), the decision threshold is determined to be TH_high2 larger than TH_high1 (step S3-9).

Figure 9:
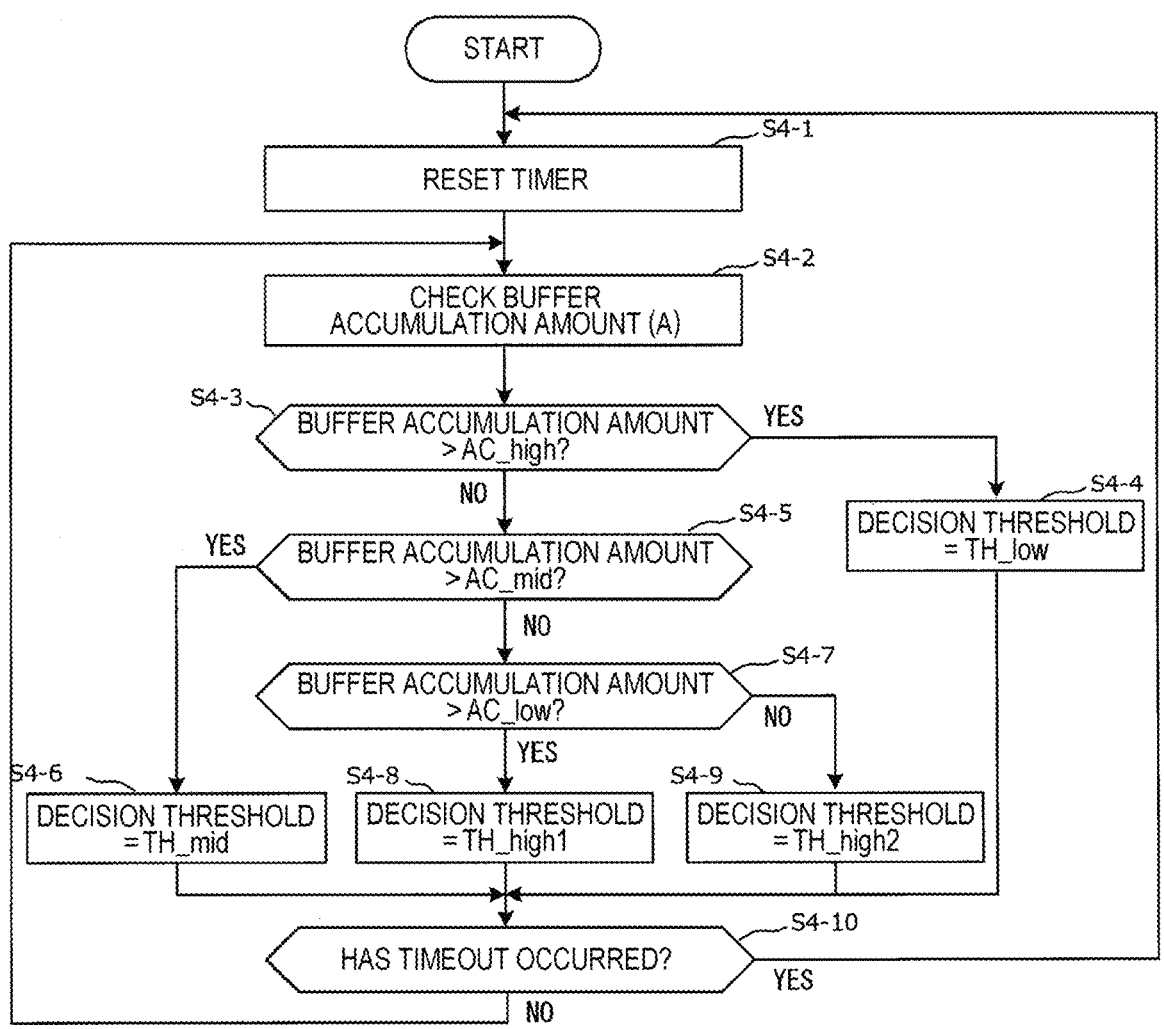
FIG. 9 is a flowchart illustrating another example of an operation procedure in the threshold determination unit according to the third embodiment of the present invention.
Figure 10:
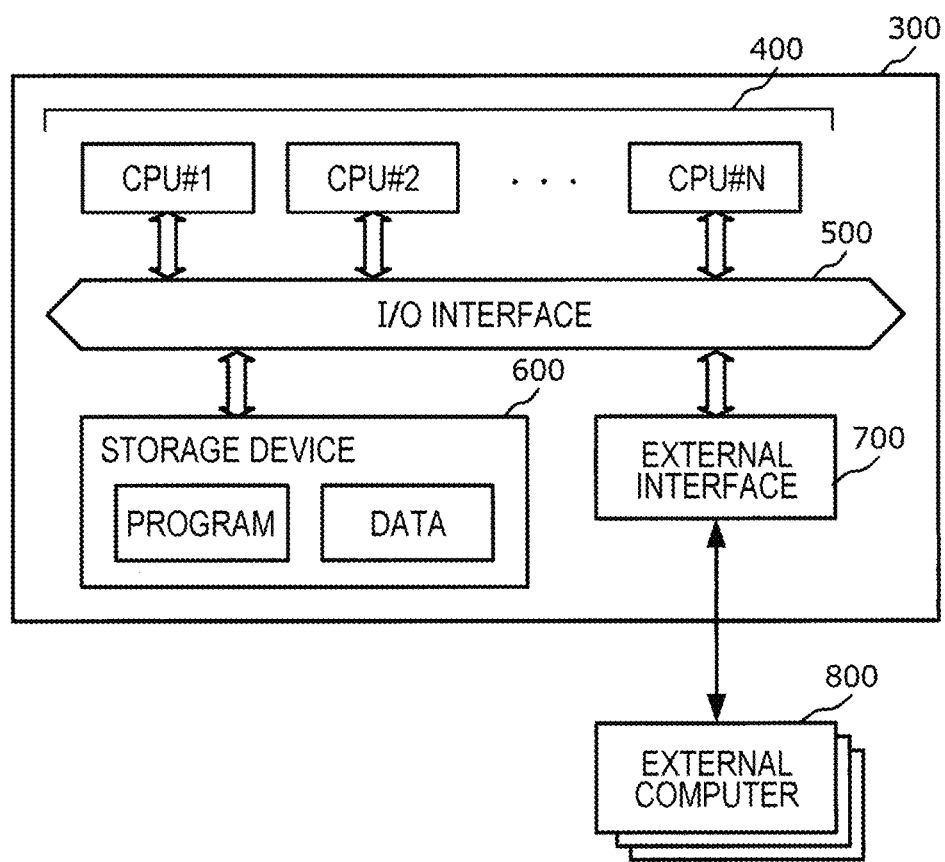
FIG. 10 is a configuration example of a computer for achieving the packet capture device according to the present embodiment.
Figure 11:
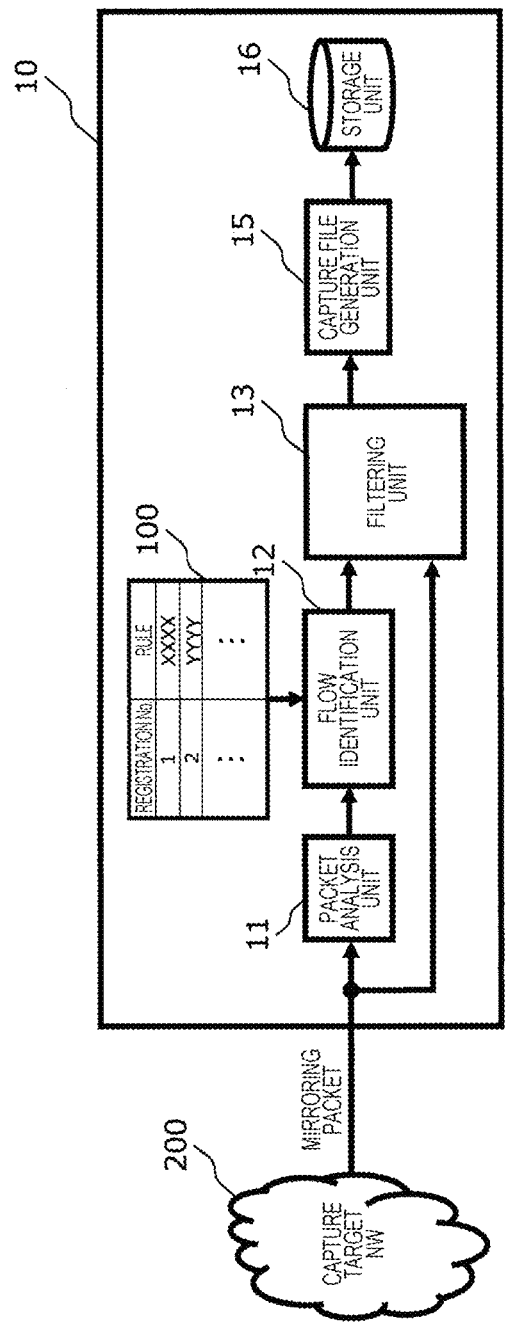
FIG. 11 is a diagram illustrating a configuration of a conventional packet capture device.

FIG. 9 is a flowchart illustrating another example of an operation procedure in the threshold determination unit according to the third embodiment of the present invention. In FIG. 8, the decision threshold is changed in accordance with the measurement interval, but in FIG. 9, the decision threshold is changed at a timing independent of the measurement interval.

In FIG. 9, the check of the buffer accumulation amount and the change of the decision threshold based on the buffer accumulation amount are repeated at predetermined time intervals. In FIG. 9, the timer at a predetermined time interval is reset (step S4-1), and the buffer accumulation amount is checked and the decision threshold is changed on the basis of the buffer accumulation amount (steps S4-2 to S4-9). The processing of steps S4-2 to S4-9 is similar to the processing in steps S3-2 to S3-9 in FIG. 8.

When a timeout has occurred after the decision threshold has been changed (step S4-10: YES), the timer is reset (step S4-1), and the buffer accumulation amount is checked again and the decision threshold is changed on the basis of the buffer accumulation amount (steps S4-2 to S4-9). When the timeout has not occurred (step S4-10: NO), the process returns to the check of the buffer accumulation amount (step S4-2), and the decision threshold is changed on the basis of the buffer accumulation amount.

The time interval in FIG. 9 can be appropriately determined by the user according to system requirements such as the amount of packets to be captured and the buffer amount. For example, the predetermined time interval may be set to a time interval to secure the processing time for processing steps S4-2 to S4-9 in FIG. 9.

As described above, according to the third embodiment, by dynamically changing the decision threshold for determining a packet to be discarded in the output adjustment unit according to the accumulation buffer amount, it is possible to avoid buffer overflow even when the capture rate decreases due to processing other than the capture rate serving as a bottleneck.

Configuration Example of Packet Capture Device

The packet capture device 10 in the present embodiment can be implemented in various forms. For example, the packet capture device 10 may be achieved by hardware of a board on a server, or the function of the packet capture device 10 may be achieved by software operating on a computer.

A configuration example of a computer operating as the packet capture device 10 is illustrated in FIG. 8. Each unit of the packet capture device 10 included in the packet capture system of the present embodiment can be implemented by a computer including a central processing unit (CPU), a storage device, and an external interface (hereinafter, external I/F) and a program for controlling those hardware resources.

The computer 300 includes a CPU 400, a storage device 600, and an external I/F 700, which are connected to each other via an I/O interface 500. A packet capture program and the like for achieving the operation of the packet capture system of the present embodiment and data such as a capture file are stored in the storage device 600, and another external computer 800 that transmits and receives a signal, a computer constituting a network, and the like are connected to the external I/F 700. The CPU 400 can execute the packet capture processing described in the present embodiment in accordance with a processing program or the like stored in the storage device 600. The processing program can be recorded in a computer-readable recording medium or can be provided via a network.

Extension of Embodiments

Although the present invention has been described so far with reference to an embodiment, the present invention is not limited to the above embodiment. Various changes that can be understood by those skilled in the art can be made in the configuration of the present invention within the scope of the present invention.

REFERENCE SIGNS LIST

10 Packet capture device
11 Packet analysis unit
12 Flow identification unit
13 Filtering unit
14 Output adjustment unit
15 Capture file generation unit
16 Storage unit
100 Rule table
200 Capture target network.

The invention claimed is:

1. A packet capture device, comprising:
one or more processors; and
a non-transitory computer-readable storage device storing a program to be executed by the processor, the program including instructions for:
analyzing input packets;
identifying a flow as a capture target from the input packets;
adjusting a packet amount of the flow to be stored as an adjusted flow, wherein adjusting the packet amount of the flow comprises:
deciding whether to store packets of the flow for each predetermined measurement interval based on a measurement result of a packet amount of the capture target in the predetermined measurement interval; and
discarding one or more first packets of the flow not to be stored as the adjusted flow;
temporarily accumulating, in a buffer, one or more second packets of the flow to be stored as the adjusted flow; and
storing, in a storage device, the adjusted flow as the capture target,
wherein the instructions for adjusting the packet amount of the flow to be stored as the adjusted flow further comprise instructions for:
determining a predetermined decision threshold according to an accumulation amount of one or more packets in the buffer; and
determining the predetermined decision threshold from a plurality of the predetermined decision thresholds based on a comparison result between the accumulation amount and an accumulation amount threshold, wherein when the accumulation amount is larger than the accumulation amount threshold, setting a first decision threshold as the predetermined decision threshold, and when the accumulation amount is equal to or smaller than the accumulation amount threshold, setting a second decision threshold larger than the first decision threshold as the predetermined decision threshold.

2. The packet capture device according to claim 1, wherein the instructions include further instructions to output information on a packet amount of the one or more first packets discarded from the flow.

3. The packet capture device according to claim 1, wherein the instructions for adjusting the packet amount of the flow to be stored as the adjusted flow comprises further instructions for:
deciding whether to store each packet of the flow for each predetermined measurement interval based on the measurement result of the packet amount of the capture target in the predetermined measurement interval and a writing rate of a respective packet from the buffer to the storage device.

4. The packet capture device according to claim 1, wherein the instructions for adjusting the packet amount of the flow to be stored as the adjusted flow comprises further instructions for:
cumulatively adding a packet length of the capture target that has been input at the predetermined measurement interval to determine a cumulative addition value; and
deciding to store a first packet of the flow when the cumulative addition value is equal to or smaller than the predetermined decision threshold; and
discarding a second packet of the capture target when the cumulative addition value is larger than the predetermined decision threshold.

5. The packet capture device according to claim 4, wherein the instructions include further instructions for:
determining the predetermined decision threshold from the plurality of the predetermined decision thresholds based on a comparison result between the accumulation amount of the one or more packets in the buffer and a plurality of the accumulation amount thresholds, wherein the plurality of the accumulation amount thresholds includes at least three different accumulation amount thresholds.

6. The packet capture device according to claim 5, wherein the instructions to determine the predetermined decision threshold include further instructions for:
- when the accumulation amount of the one or more packets is larger than a first accumulation amount threshold of the plurality of the accumulation amount thresholds, setting a first decision threshold as the predetermined decision threshold;
- when the accumulation amount of the one or more packets is equal to or smaller than the first accumulation amount threshold and larger than a second accumulation amount threshold smaller than the first accumulation amount threshold, setting a second decision threshold larger than the first decision threshold as the predetermined decision threshold;
- when the accumulation amount of the one or more packets is equal to or smaller than the second accumulation amount threshold and larger than a third accumulation amount threshold smaller than the second accumulation amount threshold, setting a third decision threshold larger than the second decision threshold as the predetermined decision threshold; and
- when the accumulation amount of the one or more packets is equal to or smaller than the third accumulation amount threshold, setting a fourth decision threshold larger than the third decision threshold as the predetermined decision threshold.

7. The packet capture device according to claim 1, wherein the instructions for adjusting the packet amount of the flow to be stored as the adjusted flow comprises further instructions for:
- acquiring information on an accumulation amount of packets accumulated in the buffer at the predetermined measurement interval, and
- sending a first input packet of the capture target to the buffer when the accumulation amount of packets is equal to or smaller than the predetermined decision threshold, and
- discarding a second input packet of the capture target when the accumulation amount of the packets is larger than the predetermined decision threshold.

8. A packet capture method, comprising:
- analyzing input packets;
- identifying a flow as a capture target from the input packets;
- adjusting a packet amount of the flow to be stored as an adjusted flow, wherein adjusting the packet amount of the flow comprises:
  - deciding whether to store packets of the flow for each predetermined measurement interval based on a measurement result of a packet amount of the capture target in the predetermined measurement interval; and
  - discarding one or more first packets of the flow not to be stored as the adjusted flow;
  - temporarily accumulating, in a buffer, one or more second packets of the flow to be stored as the adjusted flow; and
- storing, in a storage device, the adjusted flow as the capture target,
- wherein adjusting the packet amount of the flow to be stored as the adjusted flow further comprises:
- determining a predetermined decision threshold according to an accumulation amount of one or more packets in the buffer; and
- determining a predetermined decision threshold from a plurality of the predetermined decision thresholds based on a comparison result between the accumulation amount and an accumulation amount threshold, wherein when the accumulation amount is larger than the accumulation amount threshold, setting a first decision threshold as the predetermined decision threshold, and when the accumulation amount is equal to or smaller than the accumulation amount threshold, setting a second decision threshold larger than the first decision threshold as the predetermined decision threshold.

9. The packet capture method according to claim 8, further comprising outputting information on a packet amount of the one or more first packets discarded from the flow.

10. The packet capture method according to claim 8, wherein adjusting the packet amount of the flow to be stored as the adjusted flow further comprises:
- deciding whether to store each packet of the flow for each predetermined measurement interval based on the measurement result of the packet amount of the capture target in the predetermined measurement interval and a writing rate of a respective packet from the buffer to the storage device.

11. The packet capture method according to claim 8, wherein adjusting the packet amount of the flow to be stored as the adjusted flow further comprises:
- cumulatively adding a packet length of the capture target that has been input at the predetermined measurement interval to determine a cumulative addition value; and
- deciding to store a first packet of the flow when the cumulative addition value is equal to or smaller than the predetermined decision threshold; and
- discarding a second packet of the capture target when the cumulative addition value is larger than the predetermined decision threshold.

12. The packet capture method according to claim 11, further comprising:
- determining the predetermined decision threshold from a plurality of the predetermined decision thresholds based on a comparison result between the accumulation amount of the one or more packets in the buffer and a plurality of the accumulation amount thresholds, wherein the plurality of the accumulation amount thresholds includes at least three different accumulation amount thresholds.

13. The packet capture method according to claim 12, wherein determining the predetermined decision threshold comprises:
- when the accumulation amount of the one or more packets is larger than a first accumulation amount threshold of the plurality of the accumulation amount thresholds, setting a first decision threshold as the predetermined decision threshold;
- when the accumulation amount of the one or more packets is equal to or smaller than the first accumulation amount threshold and larger than a second accumulation amount threshold smaller than the first accumulation amount threshold, setting a second decision threshold larger than the first decision threshold as the predetermined decision threshold;
- when the accumulation amount of the one or more packets is equal to or smaller than the second accumulation amount threshold and larger than a third accumulation amount threshold smaller than the second accumulation amount threshold, setting a third decision threshold larger than the second decision threshold as the predetermined decision threshold; and when the accumulation amount of the one or more packets is equal to or smaller than the third accumulation amount threshold, setting a fourth decision threshold larger than the third decision threshold as the predetermined decision threshold.

14. The packet capture method according to claim 8, wherein adjusting the packet amount of the flow to be stored as the adjusted flow further comprises:
acquiring information on an accumulation amount of packets accumulated in the buffer at the predetermined measurement interval, and
sending a first input packet of the capture target to the buffer when the accumulation amount of the packets is equal to or smaller than the predetermined decision threshold, and
discarding a second input packet of the capture target when the accumulation amount of the packets is larger than the predetermined decision threshold.

* * * * *